May 2, 1961 T. KILBURN ET AL 2,982,947

MAGNETIC SYSTEMS AND DEVICES

Filed Nov. 21, 1955 2 Sheets-Sheet 1

INVENTORS:
TOM KILBURN
GEORGE R. HOFFMAN

By:
Stevens, Davis, Miller & Mosher

Attorneys

May 2, 1961 T. KILBURN ET AL 2,982,947

MAGNETIC SYSTEMS AND DEVICES

Filed Nov. 21, 1955 2 Sheets-Sheet 2

INVENTORS:
TOM KILBURN
GEORGE R. HOFFMAN

By: Stevens, Davis, Miller & Mosher
Attorneys 2,982,947

MAGNETIC SYSTEMS AND DEVICES

Tom Kilburn, Urmston, and George Richard Hoffman, Whalley Range, Manchester, England, assignors to National Research Development Corporation, London, England, a corporation of Great Britain Filed Nov. 21, 1955, Ser. No. 548,143

Claims priority, application Great Britain Nov. 26, 1954

10 Claims. (Cl. 340—174)

This invention relates to magnetic systems and to devices for detecting the state of magnetisation, either remanent or induced, of a magnetic circuit and/or to devices for effecting the storage or registration of information in binary digital form by the use of the alternative directions of polarisation of a magnetic circuit having a suitable degree of remanence as described in copending applications Serial Nos. 530,452 and 530,453. The invention has particular, although by no means exclusive, application to devices for the storage or registration of digital data in binary coded form for use in conjunction with electronic binary digital computing machines.

In the aforesaid copending applications there are described a number of arrangements in which an effective, and preferably only temporary, alteration of the reluctance of a magnetic circuit is obtained by producing a state of magnetic saturation in a localised region of the body of magnetic material froming the magnetic circuit. One described method of producing such localised saturated region involves the passage of a suitable electric current through the material of the magnetic circuit itself, for instance, by the provision of current connection means at tapping points which are appropriately spaced apart along the length of the magnetic flux path through the body of magnetic material.

Unfortunately the majority, if not all, of the magnetic materials at present available and most suitable for forming the magnetic body of such devices, especially those devices which are for use in storing binary digital information and which need to have a hysteresis loop of as near rectangular form as is possible, have a relatively high ohmic resistance and as a result of this fact the power requirement for producing a simultaneous alteration of reluctance in a considerable number of such devices becomes excessive and difficult to provide.

One object of the present invention is to provide arrangements in which the power requirement for producing the requisite localised region of magnetic saturation is materially reduced.

In accordance with one feature of the invention a device embodying a magnetic circuit and provided with means for producing a state of magnetic saturation in a localised region of a body of magnetic material forming at least a part of such circuit by the passage of an electric current through the material of said body between connection points which are spaced apart along the length of the magnetic flux path through such body, has at least that part of said body which lies between said connection points formed of material having a cross-section whose respective width and thickness dimensions are of substantially the same order.

In accordance with a further feature of the invention a device embodying a magnetic circuit and provided with means for altering the reluctance of the circuit by producing a state of magnetic saturation in a localised region of the body of magnetic material forming such magnetic circuit, has said localised region arranged to form a part of an otherwise separate magnetic circuit whose magnetisation state is controlled by a suitable reluctance-modifying current.

In order that the above and other features of the present invention may be more readily understood a number of different embodiments will now be described in greater detail and with reference to the accompanying drawings, in which:

Figs. 1 and 2 illustrate one known form of magnetic device of the general type with which the present invention is concerned.

Figs. 3–6 represent different cross-sectional forms of material usable for constructing the magnetic circuit.

Figs. 7 and 8 are perspective views of other magnetic core devices.

Fig. 9 is a perspective view of an alternative arrangement, while Fig. 10 is a developed perspective view illustrating one manner of forming the body shown in Fig. 9.

Fig. 11 is a perspective view of an alternative form of the device shown in Fig. 9.

Fig. 12 is a diagrammatic view illustrating one manner of assembling a plurality of devices according to Figs. 9 or 11 to form a core storage matrix.

Fig. 13 is a perspective view of one form of magnetic device according to the invention, while Fig. 14 is a perspective view, similar to Fig. 13, of another form of magnetic device according to the invention.

Figures 1, 2, 3, 4, 5, 6, 7, 8, 9, 10:
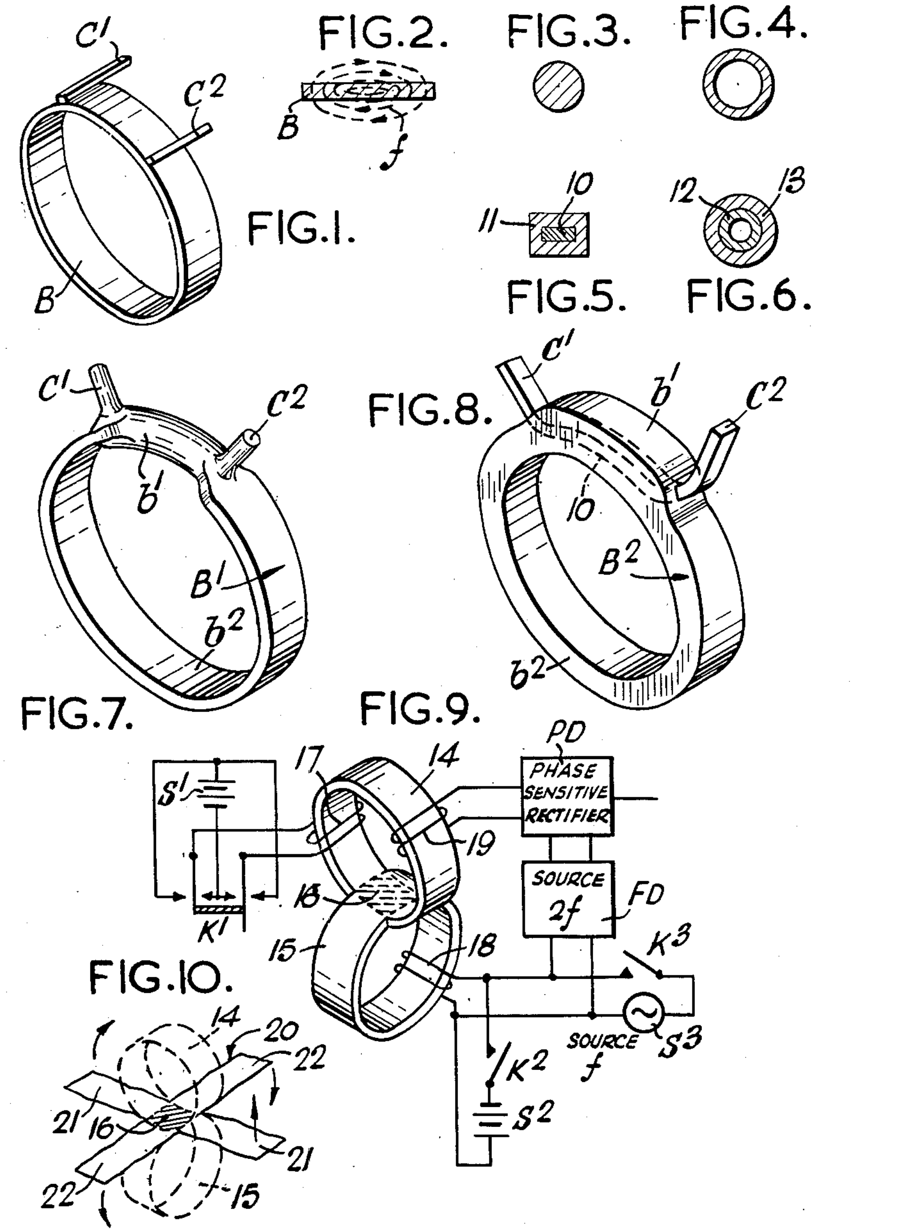

In the devices described in the aforesaid copending applications the body of magnetic material providing either the whole or a part of the magnetic circuit was constructed of material having thin rectangular-section strip form. Thus, as shown in Fig. 1 of the accompanying drawings, the body B is in the form of a ring which is either complete, as in the case of a storage device, or provided with a narrow gap, as in the case of reading or sensing device for examining another magnetisable body such as a recording tape. This body B is formed of magnetic material having a cross-section as shown in Fig. 2 and is provided with current supply terminals $C^1$, $C^2$ by which a suitable electric current may be passed through the material of the body B between the two supply terminals. With such a thin strip form of cross-section the magnetic flux due to current passing along the length of the strip material between the spaced apart connection points is partially dispersed as leakage flux outside the magnetic material, for instance as indicated at $f$ in Fig. 2. This introduces additional inefficiency quite apart from the power loss due to the high ohmic resistance of the material itself to the passage of electric current therethrough.

In order to overcome this disadvantage, it may be arranged, that the body of magnetic material forming the magnetic circuit, or at least that part of it which lies between the spaced apart current supply points and where the requisite local saturation effect is to be provided, is formed with a cross-section whose respective width and thickness dimensions are of substantially the same order.

Fig. 3 illustrates one suitable cross-sectional form for the body of magnetic material forming the magnetic circuit. This cross-section is of circular form, i.e. as a wire or rod, whereby the flux $f^1$ due to the current passing along the length of the wire or rod between the spaced apart current supply points is more effectively concentrated within the magnetic material itself instead of being partially dispersed as external leakage flux.

Alternative cross-sections are those of polygonal, e.g. hexagonal, or even square or nearly square form.

Fig. 4 illustrates a further alternative cross-sectional form for the material of the magnetic circuit, such material having a tubular cross-section which is more particularly advantageous where alternating current, particularly alternating current at a high or radio frequency, is used for interrogation purposes as described in the aforesaid copending applications.

Fig. 5 illustrates a further alternative cross-sectional form for the material of the magnetic circuit. In this case at least that part of the body of material forming the magnetic circuit which is traversed by the reluctance-modifying electric current is made of a composite form comprising a central core member 10 of material, preferably non-magnetic, which is a good electrical conductor and a surrounding envelope or sheath 11 formed of magnetic material which has the requisite magnetic characteristics and without regard to its electrical conductivity. The central core 10 may conveniently be formed of copper or silver and completely surrounded by a sheath 11 of, for instance, a suitable ferrite material.

Fig. 6 illustrates another alternative form in which the cross-section of at least that part of the body forming the magnetic circuit which is traversed by the reluctance-modifying electric current is of tubular shape and comprising an inner member 12 of tubular cross-section made of material having good electrical conductivity for carrying the reluctance-modifying current and a surrounding sheath 13 of annular section made of magnetic material having the requisite magnetic characteristics and without regard to its electrical conductivity.

Material of the cross-sections indicated above in Figs. 3, 4, 5 and 6 may be used for the formation of the magnetic circuit throughout the whole of its length or such specialised form may be restricted substantially to that part of the magnetic circuit through which the reluctance-modifying or modulating current flows. Thus, as shown in Fig. 7, a body $B^1$ in the form of an annular ring has a portion $b^1$ of restricted length, lying between the current supply terminals $C^1$, $C^2$, formed of circular cross-section according to Fig. 3 or of tubular cross-section according to Fig. 4, the remaining portion $b^2$ of the body being of thin strip form, similar in cross-section to that of Fig. 2 and of equivalent cross-sectional area to that of the portion $b^1$.

In cases where composite material, such as is shown in Figs. 5 and 6, is employed it is preferable to use such composite form only for that part of the magnetic circuit which lies intermediate the current supply terminals for application of the modulating or reluctance-modifying current. Thus, as shown in Fig. 8, the body $B^2$ forming the magnetic circuit comprises an annular ring which is of rectangular section throughout but of which only the portion $b^1$ of restricted length has the inner core member 10 of good electrical conductivity, such member being brought out as the supply terminals $C^1$, $C^2$ and the remaining portion $b^2$ of the body being constituted by a wholly magnetic material which can be either hollow such as will result from the absence of the member 10 or, alternatively, of solid form having an appropriately altered cross-section. If, as is usually the case, the core member 10 is non-magnetic, the cross-sectional area of the portion $b^2$ should be the same as that of the magnetic part of the portion $b^1$. Although not illustrated, the portion $b^1$ carrying the reluctance-modifying current may be of tubular cross-section as shown in Fig. 6.

In those cases where composite material is used throughout the length of the body of magnetic material in the form of a closed loop, it is necessary to break the continuity of the inner electrically conductive core member at some point along the second and undesired current flow path between the tapping points which are provided for connection to the source of reluctance-modifying current.

In a further arrangement the foresaid localised region of the magnetic body is arranged to form a part of an otherwise separate magnetic circuit whose own magnetisation state is controlled by a reluctance-modifying current. In the arrangement shown in Fig. 9 a first annular body or ring 14 of magnetic material, e.g. a ferrite, chosen solely on account of its magnetic characteristics and without regard to the question of reluctance-modification, constitutes a magnetic storage element for registering, say, either one of the binary digital values "0" or "1" by the assigned polarisation direction of its remanent magnetism in the usual manner. The setting up of such remanent magnetism in one or other of the two alternative directions may be effected by the use of one or more windings 17 wound around this annular ring and adapted to be supplied with energising current from a source $S^1$, shown symbolically as a battery, through a polarity-reversing switch means $K^1$, shown as a key switch. A second annular body or ring 15, conveniently of the same magnetic material as the first ring, constitutes the means for modifying the reluctance of the magnetic circuit around the first ring 14. The two rings 14 and 15 have a common and localised region 16 (shown shaded on the drawing) where the rings intersect. The ring 15 is provided with one or more windings 18 used for controlling or interrogating purposes. This winding or these windings is/are arranged to be energised with a suitable reluctance-modifying current. Such current may be either direct current or alternating current as described, for instance, in the aforesaid copending application No. 530,452.

Thus, if the current supplied to winding 18 is direct current from a source $S^2$ by closure of switch means $K^2$ and is of such a value that the region 16 is saturated by the magnetic flux in the ring 15, then any write input currents applied to one or more of the windings 17 around the ring 14 will be ineffective to alter the previously existing state of the remanent magnetisation in the ring 14. If winding 18 is de-energised, however, the magnetic flux path around the ring 14 is not then of high reluctance since the region 16 is no longer saturated by the magnetism of the ring 15 and the ring 14 can operate in the usual way. Similarly, if the winding 18 is supplied with a suitable value of alternating current of frequency $f$ from a source $S^3$ by closure of switch means $K^3$, an output current of frequency $2f$ and having a phase relationship to the current applied to winding 18 which is dependent upon the existing state of magnetisation in the ring 14, can be derived from the winding or windings 17 or from a separate winding 19 also encircling the material of the ring 14.

An output, indicative of the direction of magnetisation of the ring 14 may be obtained from a phase-sensitive rectifier circuit PD which is supplied with the output from winding 19 and with a reference current at frequency $2f$ derived through a frequency doubling circuit FD from the source $S^3$ as described in the aforesaid copending applications.

The device shown in Fig. 9 may be constructed from sheet magnetic material in the manner illustrated in Fig. 10 where a member 20, e.g. a stamping, initially of cruciform shape when in the flat state, has one pair of opposed arms 21 bent upwardly and joined to complete the first ring 14 and the other pair of opposed arms 22, lying at right-angles to the first pair of arms 21, bent downwardly and joined to complete the second ring 15. A device according to Fig. 9 may, however, be made in various other ways, for instance by moulding as a single member from a ferrite or other suitable magnetic core material as is shown in Fig. 11.

Figures 11, 12, 13, 14:
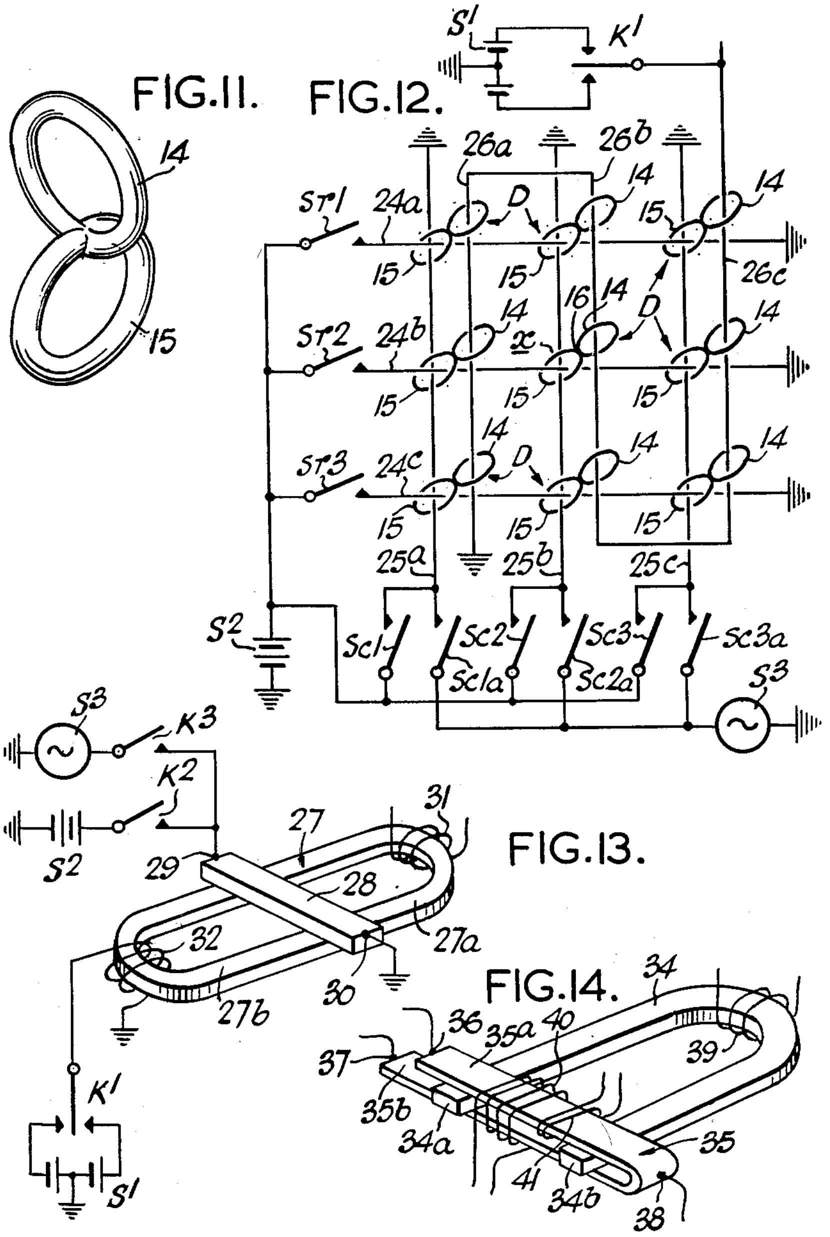

A plurality of devices of the form shown in Figs. 9 or 11 may be assembled for use in a variety of ways and one of these, with the various devices arranged in the customary form of a matrix is shown in Fig. 12. In this figure a plurality of separate magnetic core devices D, each similar to that shown in Fig. 11, are shown with their respective ring portions 15 disposed around the different intersections of a plurality of row conductors 24*a*, 24*b* and 24*c* and a plurality of column conductors 25*a*, 25*b* and 25*c*. Each of the ring portions 14 associated with the different devices D of any one column is arranged to embrace a common write-read column conductor 26*a*, 26*b* or 26*c*.

The arrangement as shown in Fig. 12 may be used operatively in a number of different ways. Thus, for example, to effect writing-in to the particular device D of the matrix shown at *x* lying in the second column of the second row, the first and third row conductors 24*a* and 24*c* are arranged each to be supplied with current suitable for saturating the rings 15 of every device by which the row conductor concerned is embraced. Such current may be provided by closure of the appropriate switches *sr*1 and *sr*3 to complete a supply circuit from a source of direct current $S^2$. The similar column conductors 25*a* and 25*c* of the first and third columns are likewise arranged to be supplied with a similar current suitable for saturating the rings 15 of every device by which the column conductor concerned is embraced. Such current may be provided by closure of the appropriate switches *sc*1 and *sc*3 to complete a supply circuit from the same source of direct current $S^2$. The polarity of the currents applied to the selected row and column conductors is such that their effect upon any device which is subjected to the effects of both currents simultaneously, is additive and not subtractive. If, now, a write input pulse is applied to all of the write-read conductors 26*a*, 26*b* and 26*c* simultaneously, e.g. by connecting such conductors in series, as shown, to form a single interlinking conductor and then closing the key switch $K^1$ in the appropriate direction to supply a current pulse from D.C. source $S^1$, such write input pulse will be effective only upon the ring 14 of device *x* since this is the only one whose associated ring 15 remains unsaturated.

In an alternative and rather simpler scheme a similar selection of the required device, e.g. that of *x* in Fig. 12, is made by applying a suitable current from source $S^2$ to the first and third row conductors 24*a* and 24*c* while applying the write input current pulse from source $S^1$ only to the second write-read column conductor 26*b*.

To effect non-destructive reading of the information stored in any one device, for instance the device *x* of Fig. 12, the first and third row conductors 24*a* and 24*c* may be arranged to be supplied with current from source $S^2$ by closure of switches *sr*1 and *sr*3 to effect sustained saturation of the rings 15 of those devices which encircle such conductors while an alternating current of suitable frequency *f* is applied to the second column conductor 25*b* from source $S^3$ by closure of switch *sc*2*a*. In this second column the device *x* is the only one whose localised region 16 at the region of intersection of rings 14 and 15 is in unsaturated condition and in consequence a read output current of frequency 2*f* will be available therefrom on the write-read column conductor 26*b* or, as shown, on the common serially connected write-read conductors 26*a*, 26*b*, 26*c*. Such derived output current may be used to indicate the polarisation direction of the device *x* in the manner already referred to.

Other arrangements are clearly possible in accordance with various known systems of arranging such magnetic storage devices in matrix form. Thus, the various conductors 26*a*, 26*b* and 26*c* can be connected in series as a single conductor in the manner shown and arrangements made to apply to one selected row conductor, for instance row conductor 24*b*, and to one selected column conductor, for instance column conductor 25*b*, an alternating current of frequency *f* having an amplitude which, by itself, is less than that necesary to effect saturation of the localised region of any device but which, in conjunction with any similar current through the associated row or column conductor, is sufficient to produce saturation. Thus, only the device *x* which lies at the intersection of conductors 24*b* and 25*b* will be saturated and the output on the now common read output conductor of serially arranged conductors 26*a*, 26*b* and 26*c* will be indicative of the information stored in that device, i.e. the device *x*.

In one embodiment in accordance with the invention a separate magnetic shunt member having the necessary good electrical conductivity is arranged across a part of a ring of magnetic material having the requisite magnetic properties for the particular purpose in view and without regard to the ohmic resistance value of such magnetic material. Referring to Fig. 13, this embodiment comprises an elongated ring 27, e.g. of rectangular cross-section, made of retentive magnetic material having a relatively high ohmic resistance. This ring 27 is provided with a magnetic shunt 28 consisting of a strip of magnetic material having low retentivity and low ohmic resistance. Such strip is conveniently also of rectangular cross-section and is provided with electric terminal connection points 29 and 30 at or near its opposite ends for the application thereto of the reluctance-modifying current. Such shunt 28 is arranged to be in good magnetic flux transfer relationship with the ring 27 at the intersection points although preferably, the junctions between the shunt 28 and the ring 27 are arranged to be of electrically insulating character such as by the provision of an intervening thin film of insulating varnish or paper laminae. The loop portion 27*a* of the shunted ring 27 is provided with one or more windings 31 while the loop portion 27*b* of the shunted ring is provided with one or more windings 32.

The operation of this arrangement follows along lines similar to those previously described. Thus, when the shunt 28 is not supplied with any reluctance-modifying current and is accordingly unsaturated, it effectively isolates the loop portion 27*a* of the shunted ring 27 from the loop portion 27*b* so that any write input currents to the winding 32 around the loop portion 27*b* will be ineffective upon the magnetisation state of the loop portion 27*a* of the ring which, with this arrangement, constitutes the storage portion. When, however, the shunt 28 is supplied with a suitable value of D.C. current therethrough from source $S^2$ by closure of switch $K^2$ so as to effect its magnetic saturation, then it ceases to have any shunting effect and the ring 27 becomes operative as a whole in a manner similar to that of a normal magnetic storage element of the already well known form. Under these conditions any write-in current applied to winding 32 from source $S^1$ by operation of switch $K^1$ will be effective upon the storage loop portion 27*a* of the ring. Similarly, by applying alternating current from source $S^3$ to the shunt 28 by closure of switch $K^3$ a non-destructive read output signal may be derived from the winding 31.

A further embodiment is shown in Fig. 14 where an incomplete loop or U-shaped member 34 of retentive magnetic material chosen with regard to its magnetic characteristics rather than its ohmic value, has its magnetic flux path between its ends 34*a* and 34*b* completed by way of the two parallel arms 35*a* and 35*b* of a bifilar member 35 which is formed of a magnetic material having low retentivity and good electrical conductivity. The ends 34*a* and 34*b* of the member 34 are arranged each to be in good magnetic flux transfer relationship with the adjacent parts of the bifilar member 35 but are preferably electrically insulated from such adjacent parts such as by the provision of an interleaving insulating film, e.g. of varnish. The member 34 is embraced by one or more coil windings 39 while the bifilar member 35 has a first winding 40 encircling both of the opposed arms 35*a* and 35*b* thereof at a point which lies between the ends 34*a* and 34*b* of the member 34 while a second winding 41 along the same portion of the bifilar member 35 is arranged to embrace one arm 35*a* only of the two opposing arms of such bifilar member. Current supply terminals 36 and 37 are provided at the free ends of the arms 35a and 35b respectively of the bifilar member while a further current supply terminal 38 is provided at the common junction point between the two arms of such bifilar member.

Such an arrangement can be operated in a number of ways. Whilst no reluctance-modifying current is being passed through either arm of the bifilar member 35 and in consequence the material thereof is unsaturated, such member 35 serves to complete the magnetic circuit of the magnetically retentive member 34 and permits operation of the latter in the usual way. Thus, registration of binary digital information may be effected therein by applying an appropriately polarised write input current to the winding 40. To render the retentive member 34 unresponsive to current in the winding 40, a suitable direct current is passed between the supply terminal 36 at the free end of one arm 35a and the supply terminal 37 at the free end of the opposite arm 35b of the bifilar member. This produces magnetic saturation of both arms 35a, 35b and consequently causes a large increase of reluctance of the magnetic circuit around the retentive member 34. To effect non-destructive reading, a suitable alternating current is applied between the supply terminals 36 and 37 of the bifilar member 35 while a read-out signal is derived from the winding 39.

In an alternative write-in method, direct current is passed through arm 35b of the bifilar member only by supply between terminals 37 and 38. At the same time, the requisite write-in currents are supplied to the winding 41 embracing the arm 35a of the bifilar member. The device is then generally similar in its manner of operation to that of Fig. 13.

Although the various constructional embodiments referred to above have all been described with relation to magnetic storage devices, it will be clear that various aspects of the invention are also applicable to devices in which the magnetic flux is induced from an external source such as a magnetic recording tape disposed across a suitable gap formed in what has hitherto been described as the retentive member.

What is claimed is:

1. A magnetic circuit device comprising first and second bodies of magnetic material, said respective bodies being arranged in magnetic flux transfer relationship to one another whereby at least a part of said second body forms a magnetic shunt between spaced points on said first body, at least one electric winding embracing said first body at a position between said spaced points shunted by said second body, and terminal means on said second body at spaced apart positions thereon for permitting the passage of electric current in said second body between said terminal means through that part of said second body which forms said magnetic shunt.

2. A magnetic circuit according to claim 1 wherein said first body of magnetic material is of loop shape defining a complete magnetic flux path therearound.

3. A magnetic circuit according to claim 1 wherein said first body of magnetic material is a loop shaped member of retentive magnetic material defining a complete magnetic flux path therearound.

4. A magnetic circuit according to claim 1 wherein said first body of magnetic material is a loop shaped member defining a complete magnetic flux path therearound and in which at least one electric winding embracing said first body is provided at each side of said magnetic shunt formed by said second body of magnetic material.

5. A magnetic circuit according to claim 4 wherein said first body is of retentive magnetic material and said second body is of non-retentive magnetic material.

6. A magnetic circuit device comprising a first body of retentive magnetic material shaped to define a U-shaped region, a second body of non-retentive magnetic material having good electrical conductivity arranged as a magnetic shunt between points on said first body which lie on opposite sides of said U-shaped region, said respective first and second bodies being arranged in good magnetic flux transfer relationship but electrically insulated from each other at said points, at least one electric winding encircling said first body within said U-shaped region, and terminal means on said second body at positions which are spaced apart for passing electric current through said second body over at least a part of the portion thereof which forms said magnetic shunt.

7. A magnetic circuit device comprising a first body of retentive magnetic material having high electric resistance and shaped to define a U-shaped region, a second body of non-retentive magnetic material having good electrical conductivity and including a linear region passing from one side to the other of said U-shaped region of said first body, said respective first and second bodies being arranged in magnetic flux transfer relationship at each side of said U-shaped region of said first body whereby at least a part of said second body forms a magnetic shunt between spaced points on opposite sides of said U-shaped region of said first body, at least one electric winding encircling said first body within said U-shaped region thereof and electric terminal means on said second body at positions which are spaced apart along the length thereof for passing electric current through said second body over at least a part of said linear region forming said magnetic shunt.

8. A magnetic circuit device comprising a U-shaped body of magnetic material forming a first magnetic member, a second magnetic member of bifilar form having two parallel arms of electrically conductive magnetic material, said arms being electrically insulated from one another throughout their length and each serving to interconnect magnetically the free ends of said first magnetic member so as to complete a magnetic flux path therethrough, at least one electromagnet winding embracing said first magnetic member, at least one electromagnetic winding embracing both of said arms of said second magnetic member and current supply terminals at the ends of each of said arms of said second magnetic member.

9. A magnetic circuit device comprising a U-shaped body of magnetic material forming a first magnetic member, a second magnetic member of bifilar form having two spaced parallel arms of electrically conductive magnetic material, each of said arms serving to interconnect magnetically the free ends of said first magnetic member, at least one electromagnet winding embracing said first magnetic member, at least one electromagnet winding embracing both of said arms of said second magnetic member, at least one further electromagnet winding embracing one only of said arms of said second magnetic member and current supply terminals at the ends of each of said arms of said second magnetic member.

10. A magnetic circiut device comprising a U-shaped body of magnetic material forming a first magnetic member, a second magnetic member of bifilar form having two spaced parallel arms of electrically conductive magnetic material, each of said arms serving to interconnect magnetically the free ends of said first magnet member, at least one electromagnet winding embracing said first magnetic member, at least one electromagnet winding embracing both of said arms of said second magnetic member, at least one further electromagnet winding embracing one only of said arms of said second magnetic member, means electrically interconnecting one adjacent pair of ends of said two arms and current supply terminals at the opposite ends of each of said arms and at said interconnected ends of said arms of said second magnetic member.

(References on following page)

References Cited in the file of this patent

UNITED STATES PATENTS

| | | |
|---|---|---|
| 1,788,152 | Dowling | Jan. 6, 1931 |
| 2,521,536 | Reardon | Sept. 5, 1950 |
| 2,700,703 | Nordyke | Jan. 25, 1955 |
| 2,716,736 | Rex | Aug. 30, 1955 |
| 2,886,790 | Snyder | May 12, 1959 |

FOREIGN PATENTS

| | | |
|---|---|---|
| 1,043,309 | France | Sept. 26, 1951 |

OTHER REFERENCES

"Nondestructive Sensing of Magnetic Cores" by D. A. Buck and W. I. Frank, published January 1954 in Communications and Electronics, pp. 822–830.